FIG. 1

INVENTOR.
JOHN P. BURGARELLA
BY Brown and Mikulka
and
Gerald L. Smith
ATTORNEYS

INVENTOR.
JOHN P. BURGARELLA
BY Brown and Mikulka
and
Gerald L. Smith
ATTORNEYS

FIG. 7

INVENTOR.
JOHN P. BURGARELLA
BY Brown and Mikulka
and
Gerald L. Smith
ATTORNEYS 3,620,143
**AUTOMATIC EXPOSURE CONTROL SYSTEM
WITH FAST LINEAR RESPONSE**
John P. Burgarella, Sudbury, Mass., assignor to
Polaroid Corporation, Cambridge, Mass.
Filed Dec. 16, 1968, Ser. No. 783,855
Int. Cl. G03b 7/08
U.S. Cl. 95—10 C                              13 Claims

ABSTRACT OF THE DISCLOSURE

An automatic exposure control system for regulating one or more variable photographic exposure parameters. The light levels of a scene are evaluated using one or more photovoltaic cells. The cells are operated in a current mode through use of an operational amplifier having an input circuit which incorporates a capacitive feedback path. With the system, a highly responsive linear output representative of scene light levels is derived for use in controlling an exposure.

BACKGROUND OF THE INVENTION

Automatic exposure control systems have been developed and marketed by the photographic industry as part of a continuing effort to improve and simplify the procedures for effectively operating photographic devices. The systems basically function to evaluate scene brightness or illumination, weight this evaluation with respect to the sensitometric characteristics of the film being exposed and regulate one or more variable exposure control parameters such as exposure interval or aperture size in correspondence with the weighted evaluation. Scene brightness evalution is performed with light measuring circuits utilizing one or more photosensitive elements positioned upon a camera apparatus. The elements are aligned in a manner such that they are responsive to the light characteristics of a scene approximately coincident with that of the filed of view of the camera lens system.

Photographic devices incorporating automatic exposure controls usually employ light measuring circuits configured to provide for automatic regulation of the exposure interval control parameter, aperture settings being fixed or manually preselected prior to each exposure. Such exposure interval or shutter control is typically accomplished by integrating the output of a light sensitive circuit over an interval determined in accordance with a reference level signal. For instance, one popular timing arrangement utilizes a voltage sensitive trigger circuit for operating the opening and closing blades of a shutter to initiate and terminate an exposure. The circuit includes an R–C network, the resistor component of which is a photoconductive element whose resistance is functionally related to the level of brightness of a scene to which the element is exposed. Activation of the R–C network occurs substantially at the same time the shutter is opened and the arrangement generates a trigger voltage in a period of time dependent upon the capacitance of the network and the resistance of the element as established by the level of scene brightness. The voltage sensitive trigger circuit is responsive to the voltage generated by the R–C network such that when the voltage reaches a predetermined trigger voltage, the shutter closing blade is actuated to terminate exposure and thereby define an exposure interval.

In their more elementary form, these conventional automatic interval timing control systems perform with acceptable accuracles under more or less ideal scene lighting conditions. However, as the elementary systems are called upon to operate under a broaded scope of scene lighting situations they experience performance limitations. These limitations stem principally from two functional characteristics. First, the signal response of the photosensing circuits is not linear over the scene light levels commonly encountered in modern photographic practice. Secondly, the response rates experienced by most of the photosensing circuits are relatively slow and, as a consequence, the systems are unable to adequately accommodate for transient scene lighting conditions.

Looking to the design difficulties generated by a nonlinear photomertic performance, in theory, for a film of any given sensitometric properties the control over an exposure parameter should be linearly related to any given level of scene brightnes, discounting the anomaly of reciprocity failure. Without correction, therefore, the accuracy of the control systems will be limited to a narrow band or range of scene light levels and above or below such range, exposure error will result.

The nonlinear performance of the systems basically is derived from the output characteristics of their photosensitive elements. These elements often produce a nonlinear response over the spectral region of interest for ordinary photographic purposes. To adjust for this response a nonlinear correction must be inserted into the sensing system. Such corrections are difficult and often complex to the extent that in most applications only an approximate correction is inserted for accommodating only certain predetermined ranges of scene brightness. Such expedients limit desired versatility of automatic control systems.

The errors induced by nonlinearity of the scening elements can, of course, be minimized by manual adjustments to a camera such that the exposure error is within permissible limits determined by the latitude of the film used. However, this expedient does not represent a satisfactory solution for "automatic" cameras. The outputs of photoresistive or photoconductive cells may also be found to be irregular as a result of a photosensitive memory characteristic inherent in their makeup. For instance, the output of the cells is erratic when they experience a sudden and somewhat pronounced change in light levels. This irregularity is commonly witnessed when a camera utilizing one of the cells is taken from a dark environment to a light environment and a photographic exposure is made shortly thereafter.

Experience with automatic exposure control systems of conventional design has suggested that refinements are needed in the response rates of their photosensors. Where the photosensors are used in a light sensing circuitry for determining exposure interval, they should be capable of reacting to and measuring variations in scene light levels occurring during that exposure interval. Such situations are commonly encountered when auxiliary artificial or transient lighting such as derived from flashbulbs is employed in illuminating a scene. Light dependent resistive elements react too slowly to the light impulse provided by a flash device, that is, they are unable to respond at a rate usually associated with the rise-time characteristics of common flashbulbs. Consequently, the control circuitries within which they are inserted are incapable of accurately evaluating the quantity of light reflecting from the subject matter being photographed. To overcome this inaccuracy, conventional automatic exposure control systems generally resort to the insertion of compensation schemes into the control circuitry or to the introduction of a fixed exposure interval into a shutter mechanism when a flash mode of operation is contemplated. These alterations, however, detract from the performance capabilities of the control systems.

Systems for automatically controlling exposure aperture as opposed to exposure interval are rarely encountered where a rapid response to scene lighting is required by a control program. Generally, such controls must incorporate diaphragm blade dynamics which are too rapid with resepct to the characteristics of photosensitive devices. The designs for aperture control devices generally call for modification of the light permitted to reach the photocell in correspondence with the alteration of diaphragm aperture. Inasmuch as this adjustment should be raipd, the rate of response of the photosensing device must be swift. Sensing circuits utilizing photoconductive elements are generally incapable of providing the response rates requisite for such uses. In addition to response rate deficiencies, the nonlinear signals with which aperture adjusting circuits must function lead to exposure inaccuracies which, when combined with the slow response rates, suggest the impracticability of performing automatic aperture adjustment.

As evidenced by the foregoing, the performance of automatic exposure control systems can be considerably enhanced if their light sensing circuitries can operate with linear light sensing input signals. The capacities of these systems can be broadened to include more accurate evaluations of transient lighting by improving their response rates. Further, the operation of such control systems incorporating both linear light sensing characteristics along with rapid response rates will considerably improve the performance capabilities of cameras utilizing automatic control systems.

SUMMARY OF THE INVENTION

The present invention is addressed to an automatic photoelectrically controlled exposure control system which evidences a considerably broadened performance capability over systems heretofore introduced into the photographic arts. This improved performance evidenced in the system stems from two highly advantageous operational characteristics. First, the light sensing circuitry of the invention operates to form a linear output representative of the light levels of a scene witnessed by one or more of its photosensing elements. Secondly, the light sensing function of the system enjoys a very high rate of response to any variations in the light or incident on the photocell.

The linear output characteristics of the light sensing function of the system of the invention permits the formation of accurate and consistent scene light level evaluations over a broad range of photographic conditions. These evaluations are available without the insertion of electronic or mechanical subsystems designed to accommodate the nonlinear signal outputs of typical photoconductive sensing devices. As a result, the light sensing network of the invention complements the design of more versatile and yet noncomplex photographic exposure control devices. With the system of the invention, these devices will retain a high accuracy and high reliability even though operated in broadly varying lighting environments.

A particularly advantageous feature of the light sensing circuitry of the inventive system resides in its use of a conventional and readily available photoelectric element. By uniting a photoelcltric sensing element with an amplification arrangement which permits an output current generated by the element to be limited only by the internal impedances of the element itself, the photoelectric element derives a substantially linear output signal in response to scene light. Inserted within a control system, such a signal may then be utilized for controlling an exposure mechanism to regulate an exposure parameter accurately over a broad range of illumination conditions.

Photovoltaic cells are utilized as the sensing elements of the system. While providing a nonlinear response when operated in a conventional manner to generate a voltage signal representative of photic stimulation, these elements exhibit a substantially linear response to such stimulation when operated with very low external load resistances. This loading arrangement is provided by an amplification system which, when coupled with the outputs of the photovoltaic cells, exhibits an apparent input impedance of substantially zero.

The amplifier used within the system is of a variety sometimes referred to as an "operational amplifier." For the photographic application at hand, the amplifier is of a differential variety, having its input terminals connected with the photovoltaic sensors so as to receive the output thereof as a difference of potential. When considered in open circuit isolation and in an analytically ideal state, the operational amplifier is regarded as deriving infinity gain, infinity input impedance and zero output impedance. In the instant exposure control system, however, an input or feedback circuit is incorporated with this form of amplifier which permits the photovoltaic cell to operate into an arrangement of substantially zero input impedance. The input circuit includes a feedback path coupled between one input terminal and the output of the amplifier. This feedback path is characterized by its responsiveness to any difference of potential across the amplifier input terminals. The response evidenced in the path is one providing a substantially instantaneous feedback of opposite polarity to any differential signal voltage impressed across the amplifier input terminals by the light sensing photovoltaic cell. To provide a feedback signal of such opposite polarity, impedance or capacitor means are incorporated within the feedback path.

By virtue of the capacitive feedback provided within the amplifier input circuit, photovoltaic cells, when operating within the amplification scheme of the invention, function to generate an output current limited only by their own internal impedances.

With the substantially linear output response to incident scene light provided by the combination of a photovoltaic cell with a differential amplifier having a capacitive feedback path, conventional and relatively simply designed gain devices may be used within exposure control systems for adjusting light level response in accordance with the sensitometric properties of photosensitive films. The nonlinear corrective systems required heretofore for use with photosensitive elements are no longer needed with the instant system.

Photovoltaic cells when operated either in a voltage generating or current mode as above described, evidence a rate or time of response to scene illumination highly desired in automatic exposure control systems. This somewhat ideal response characteristic permits the light sensing systems to track or follow the light levels of a scene being photographed while they undergo dynamic change. In most applications, this transient or dynamic fluctuation in light levels will be encountered when using auxiliary flash illumination during a photographic exposure. The response of the photovoltaic cells is sufficient to detect and adequately react to the rise time characteristic of the artificial lighting used during a flash exposure. With such response, the effects of artificial illumination upon a scene being photographed can be gaged with high accuracy, thereby enhancing the operational capability of a camera system. The photovoltaic cells are further characterized in having no memory characteristics. For instance, control systems incorporating them may be moved from a dark surrounding to a bright surrounding without affecting the level of response of the cells. In further advantage, the output characteristic of photovoltaic cells are substantially temperature stable.

By combining both the advantages derived from the above described linear output and high response rate, the exposure control system of the invention enjoys both broadened capabilities and enhanced accuracies.

Another feature and object of the invention is to provide an exposure control system and apparatus which incorporates at least one photovoltaic cell, oriented with respect to a scene being photographed, for generating a sensing output representative of the light levels of the scene. The photovoltaic cell is coupled with a differential amplifier having a feedback path including capacitor means. With such a coupling, the cell is operated in a current mode in response to photic stimulation. The exposure control system further includes an exposure mechanism having at least one controllable exposure parameter and means for regulating that parameter in response to the output of the amplifier coupled with the photovoltaic cell. In one aspect of the invention the exposure parameter controlled by the system is that of exposure interval. In another embodiment, aperture size is controlled with the system of the invention.

It is another object of the invention to provide a control system and apparatus which incorporates at least one photovoltaic cell, oriented with respect to a scene being photographed for generating a sensing output representative of the light levels of the scene. The output of the photovoltaic cell is varied in synchrous coordination with a continuous adjustment of the dimension of an aperture positioned before the objective lens of a photographic apparatus.

Other objects of the invention will in part be obvious and will in part appear hereinafter.

The invention accordingly comprises the system, apparatus and method possessing the features, technique and properties which are exemplified in the description to follow hereinafter and the scope of the application will be indicated in the appended claims.

DETAILED DESCRIPTION OF THE DRAWINGS

The exposure control system of the invention functions to make a photometric evaluation of scene lighting using a photosensitive element and to regulate at least one exposure parameter of an exposure mechanism in accordance with that scene light level evaluation. This exposure regulation will in most applications take the form of a shutter speed control or of an automatic aperture selection. The exposure system is characterized by the unique combination of a photovoltaic sensing element with an amplification circuitry. With the amplification circuitry and its feedback arrangement, the photovoltaic cell is permitted to operate in a current mode. As such, it is capable of evaluating the light levels of a scene and producing or generating a signal which varies linearly with these levels. The use of a photovoltaic form of cell in the present system introduces a second highly desired characteristic, that is, such photosensitive elements will provide rapid response times.

In the discussion of the control system which follows, the general circuitry of the control system is initially described in connection with FIGS. 1 through 4. Following this discussion of the general circuitry, a first embodiment with which the circuitry may be used for controlling exposure interval is described in connection with FIGS. 5 and 6. Following the above, the description turns to a discussion of an embodiment wherein aperture regulation may be provided with the circuitry.

GENERAL CIRCUITRY

Figure 1:
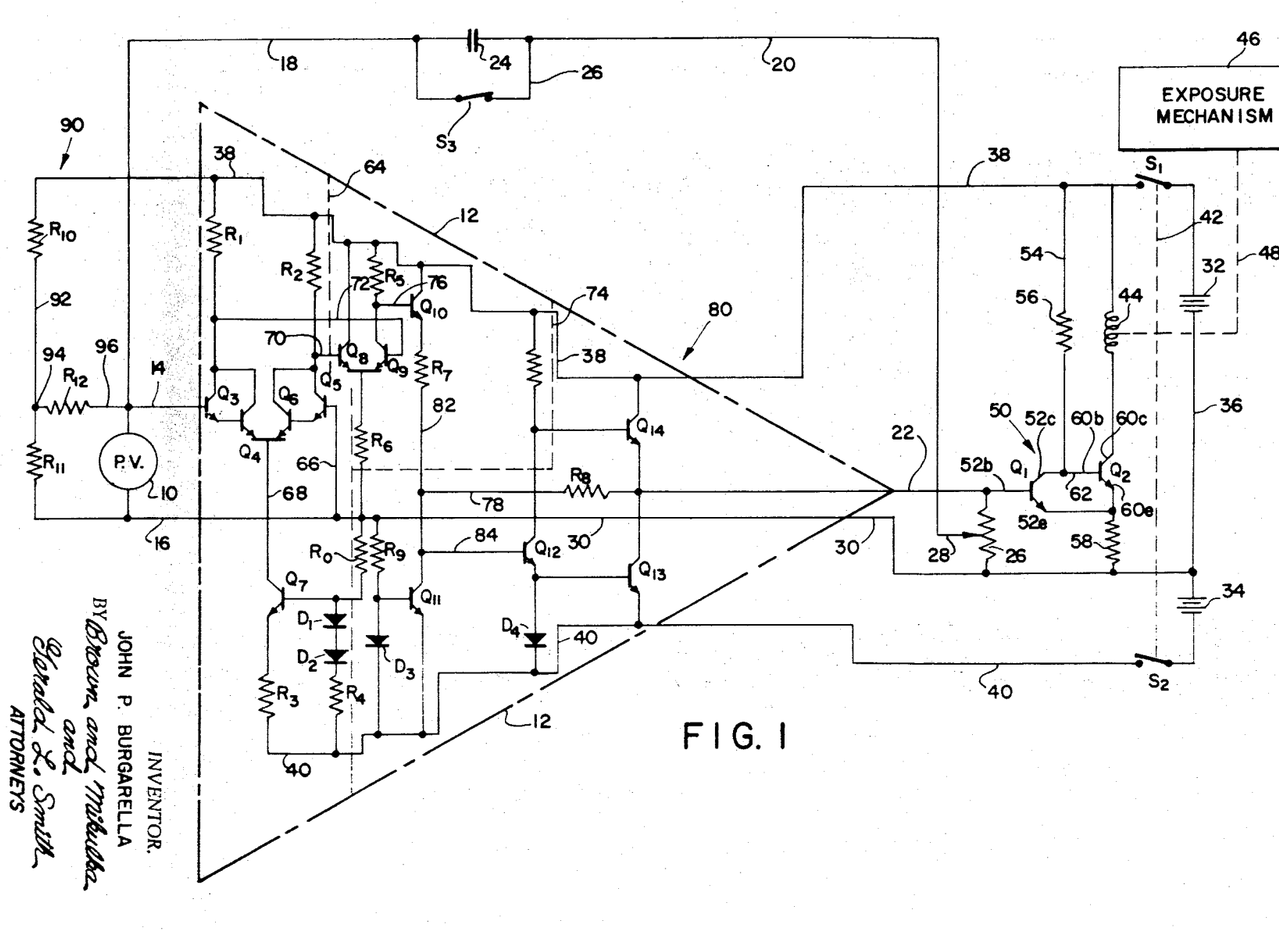
FIG. 1 is a schematic diagram of a control system of the invention showing a light sensing circuitry for use in regulating one or more exposure parameters.

Referring to FIG. 1, the circuitry of a control system according to the invention which may be used to operate any of a variety of exposure parameters is portrayed. In its basic structure the control circuitry comprises a photovoltaic cell as at 10, the output of which is inserted into the input circuitry of a differential form of amplifier illustrated within a dotted line boundary 12. The photocell 10 may be mounted upon a camera structure and oriented to evaluate the light levels of a scene coincident with the field of view of the lens system of the camera. The cell 10 will generate an output signal which may be considered to be introduced to the input circuitry of the differential amplifier 12 at its input terminals 14 and 16.

Figure 2:
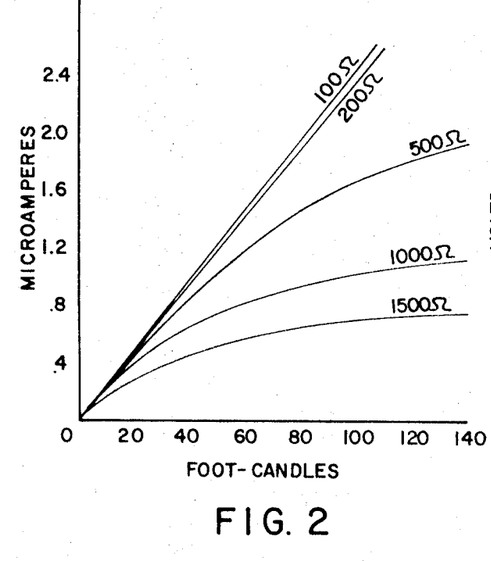
FIG. 2 is a characteristic curve showing a relationship between the illumination and resulting open circuit voltage for photovoltaic cells.

Turning momentarily to FIG. 2, the output characteristics of a photovoltaic cell are depicated as it is operated in a current mode. As the external resistance imposed across the cell is diminished, its current characteristic begins to assume a linear relationship with illumination. For instance, the graph indicates that at about 200 ohms external load resistance, the current mode characteristics of the cells may be considered linear. Above this resistance level, however, the output characteristics of the cells become nonlinear. The circuitry of the instant invention is capable of permitting a photovoltaic cell to operate at external resistance allowing the illustrated linear output.

Returning to FIG. 1, this operational arrangement is illustrated. The amplification system 12 by which the photovoltaic cell 10 is permitted to achieve a linear output is one sometimes referred to in the art as an "operational amplifier." The amplifier is of a differential variety for purposes of facilitating its fabrication in practical, miniaturized form. When considered ideally, the amplifier 12 has infinite gain and infinite input impedance and a zero output impedance. To function in a manner permitting the photovoltaic cell 10 to operate in a current mode, however, the input circuitry of the amplifier 12 is structured such that the apparent input impedance or that "seen" by cell 10 is substantially zero. Consequently, the current generated by the photovoltaic cell is limited substantially only by its own internal impedance. To accomplish this effect a feedback path depicted having path lines 18 and 20 is connected between one input terminal, as at 14, of the amplifier 12 and the output terminal of the amplifier, as shown at line 22. Within the feedback path there is coupled a capacitor shown at 24. Around capacitor 24 there is a bypass line 26 within which is inserted a normally closed switch $S_3$.

With the feedback arrangement described, any difference of potential supplied by the photovoltaic cell 10 across input leads 14 and 16 will operate to cause a current of opposite polarity to be produced at feedback path line 20 or the output end of capacitor 24. As a consequence, the feedback path provides a substantially instantaneous feedback signal of opposite polarity which serves to counteract any differential signal voltage impressed by the cell 10 across the input terminals 14 and 16. The polarity reversal at capacitor 24 derives a preferential flow of current from the photovoltaic cell into and through the capacitive feedback path rather than through the input of the differential amplifier 12. Thus, although the amplifier 12 has a very high input impedance, the photocell 10, when connected in the system described, experiences only a very low impedance. Therefore, the current output of the photovoltaic cell 10 is directed into the feedback path along line 18.

The output of the light sensing and amplification system may be treated in a number of ways to evolve regulation of a photographic exposure parameter. In the present illustration, the amplified output of the system is first calibrated by a potentiometer 26 having a wiper arm 28 connected to feedback path line 20. Following calibration the signal is inserted within a voltage sensitive trigger circuit for comparison with a reference level voltage representative of an appropriate exposure value.

Looking more specifically to the calibrating function at potentiometer 26, as the capacitor 24 is charged by the current output from a photovoltaic cell 10, a corresponding output voltage $V_o$ will be present at the output of amplifier 12. This output is considered to be present at line 22 in relation to a reference level at ground line 30. Assuming that the photovoltaic cell 10 is witnessing a constant light level, the capacitor 24 will be charged at a uniform rate representative of the amount of light passing through the exposure system.

Figure 3:
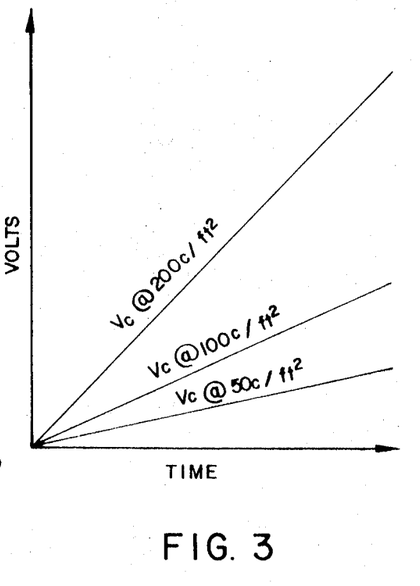
FIG. 3 illustrates a family of curves showing charge buildup across the capacitor incorporated within the feedback path of the amplification arrangement of the invention.
Figure 4:
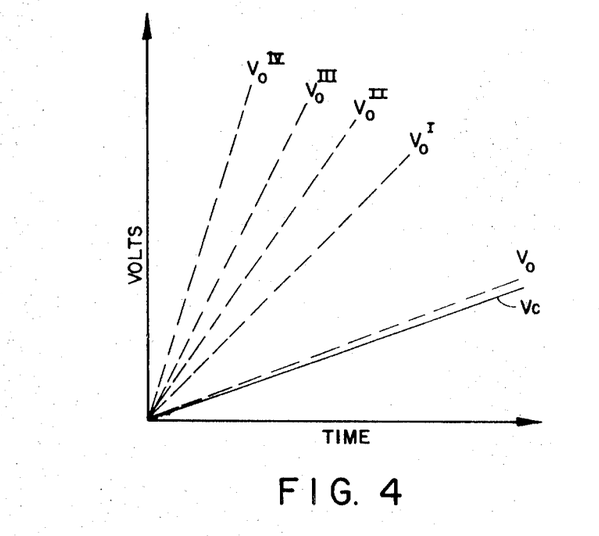
FIG. 4 is a graph showing the variations in output signal response achieved with the calibration control of the instant exposure control system.

Referring to FIG. 3, a family of curves are illustrated showing the charge buildup across capacitor 24 for a variety of constant scene light levels. Note in the figure that at different light levels the rate of charging will vary, the higher rates being present at highest light levels. This voltage buildup is again depicted in FIG. 4 as curve $V_c$ representing charge buildup for a given scene light level. For convenience of illustration, the curves of the latter figure are shown evidencing a positive voltage orientation. Such orientation, of course, will be realized should the output of photovoltaic cell 10 be a negative one. By inserting the potentiometer 26 between reference level 30 and output line 22, the voltage buildup at the output of the amplifier will be varied in accordance with the position of wiper arm 28. The effects of various adjustments of the position of arm 28 are illustrated by the dotted curves representing output voltages $V_o$ to $V_o^{IV}$. With this arrangement, the control system may be readily adjusted to conform with the particular sensitometric properties of the film being used in a photographic apparatus.

In order to provide for the regulation of an exposure parameter, the control system includes a form of comparison network which responds to preselected levels of the output of the sensing and amplification circuitry. A variety of design alternatives are available for this purpose, however, in the present arrangement a voltage sensitive trigger circuit is utilized. To power this circuit, as well as the amplification system, a tapped power supply including power sources such as batteries 32 and 34 is utilized. Note that the center tap conductively linked with battery connecting line 36 is the reference level or ground line 30. The outer leads of the tapped power supply are indicated at lines 38 and 40. Power is inserted within the entire system upon the closure of simultaneously actuated switches $S_1$ and $S_2$ inserted respectively in lines 38 and 40. A mechanical linkage between these switches is indicated at 42.

The voltage sensitive circuit of the system is of a variety which continuously energizes a circuit element such as the coil 44 of a solenoid arrangement or the like until the receipt by the circuit of a predetermined output signal level. At such time as the select signal level is reached, the coil arrangement as at 44 is de-energized to cause the actuation of an exposure control mechanism. The electromechanical linkage between an exposure mechanism as indicated functionally at 46 and coil 44 is depicted by a dotted line 48. The voltage sensitive switching function which actuates coil 44 may take the form of a transistorized Schmitt type trigger circuit located generally at 50. Circuit 50 has an input that is a normally nonconducting stage, and includes a transistor $Q_1$ having base, collector and emitter electrodes 52b, 52c and 52e respectively. Collector electrode 52c of $Q_1$ is connected to line 38 of the power supply through line 54 and a biasing resistor 56. Emitter electrode 52e of transistor $Q_1$ is connected to ground line 30 through a biasing resistor 58. The normally conducting stage of circuit 50 includes a transistor $Q_2$ having base, collector and emitter electrodes respectively at 60b, 60c and 60e. Electrode 60c is connected to line 38 through the coil 44 of an electromagnet and is energized when $Q_2$ assumes a conducting status. Base electrode 60b of transistor $Q_2$ is connected to collector electrode 52c of transistor $Q_1$ through lead 62, and emitter electrode 60e of transistor $Q_2$ is connected through bias resistor 58 to ground line 30. It may be noted that with the above arrangement there is essentially a common emitter resistor, the resistive value of which is selected for establishing the threshold voltage at which it is desired to trigger the circuit 50. It may be noted that the threshold voltage for the trigger circuit will be equivalent to the voltage across resitor 58 plus the voltage at the base-emitter junction of transistor $Q_1$.

Triggering circuitry 50 functions when switches $S_1$ and $S_2$ are simultaneously closed. The opening of switch $S_3$ arms the light sensing circuitry. With the closing of switch $S_1$ the coil 44 of an electromagnet is energized as the transistor $Q_2$ assumes a conductive state, the base electrode 60b thereof having been gated from resistor 56 on line 54. Transistor $Q_2$ continues to conduct, thereby permitting the continued energization of the coil 44, until the base electrode 52b of transistor $Q_1$ receives a triggering voltage. As transistor $Q_1$ is triggered into conduction, the voltage at base 60b falls below its trigger level and coil 44 ceases to be energized. The de-energization of coil 44, in turn, functions to limit a controlling mechanism at 46. Transistor $Q_1$ is coupled to receive the output of the amplifier 12. As a consequence, when the voltage buildup at output line 22 reaches a preselected value which forward biases the base-emitter junction of transistor $Q_1$, the latter begins to conduct and cause the above described switching function. Those versed in the art will recognize that the common emitter coupling between transistors $Q_1$ and $Q_2$ in combination with the resistor 58 forms a regenerative arrangement for improving the sensitivity of the triggering circuit.

Attention is now returned to the format or circuit assembly of the amplifier illustrated within the dotted boundary line 12. Amplifier 12 is one of a differential variety having an output inverted with respect to terminal 14. Design considerations for the amplifier generally require a tapped power supply, and as discussed earlier, this supply is provided by two battery sources 32 and 34 to power lines 38 and 40 and into a reference or ground level line 30. The latter reference level line is illustrated connected with the input terminal 16 of the amplifier. Amplifier 12 is more conveniently considered as a multi-stage amplifier, accordingly, the circuitry within the boundaries of dotted line 12 are subdivided into a series of stages. The first of these stages may be termed an "input differential amplifier" and is outlined within the internal boundary line 64. Amplifier stage 64 basically includes two pairs of Darlington connected transistors, one pair being shown at $Q_3$ and $Q_4$ and the opposite pair being shown at $Q_5$ and $Q_6$. The orientation of these coupled pairs will be recognized as one designed for differential amplification. In this regard it will be noted that the base of transistor $Q_3$ is coupled with amplifier input terminal 14 while the base of transistor $Q_5$ in the opposite transisor couple is connected with input terminal and reference level line 16 through line 66. The emitters of transistors $Q_4$ and $Q_6$ are joined in common with a lead 68 which is, in turn, coupled with a constant current arrangement including transistor $Q_7$. Diodes $D_1$ and $D_2$ coupled with the base electrode of transistor $Q_7$ function as temperature compensators for current source $Q_7$ which primarily provides a high common mode rejection in support of the operation of the differential amplification transistor $Q_3$ and $Q_6$. The base of transistor $Q_7$ additionally is coupled through a resistor $R_0$ to ground reference line 30. Resistor $R_1$ in the collector path of transistor $Q_3$, resistor $R_2$ in the collector circuit of transistor $Q_5$ function as load resistors from the input line 38 connecting the tapped power supply. Similarly, resistors $R_3$ and $R_4$ are present in the power supply input from line 40. The differential amplifier stage 64 provides a high gain to the input at terminals 14 and 16 and presents a secondary differential output signal at lines 70 and 72. The differential output signal at lines 70 and 72 is impressed upon the next stage of the amplifier as illustrated by the dotted line boundaries 74. Stage 74 is conventionally referred to as a "second differential amplifier and emitter follower." The second differential stage 74 includes transistors $Q_8$ and $Q_9$ the base electrodes of which are coupled respectively with input lines 70 and 72 Thusly coupled, the transistors $Q_8$ and $Q_9$ provide additional voltage gain to the previously amplified signal. A load resistor $R_5$ is inserted into the collector path of transistor $Q_9$ while a resistor $R_6$ is provided between reference level 30 and the common emitter electrodes of transistors $Q_8$ and $Q_9$. Note that while a differential signal input is inserted into stage 74, a single ended output is emitted from the transistor $Q_8$–$Q_9$ coupling along line 76 to be presented to an emitter follower arrangement including a transistor $Q_{10}$ and resistor $R_7$. Resistor $R_7$ is inserted within the emitter path of transistor $Q_{10}$ and is coupled with line 78. The signal emanating from the above described emitter follower arrangement will be characterized in having a very high voltage with respect to ground at line 30. This condition is treated in the stage to follow. The impedance at the emitter junction of transistor $Q_{10}$ is found to be of relatively low magnitude, and the signal at this junction can be considered as coming from a voltage source. The latter signal is introduced to the final stage of the amplification scheme delineated within the dotted line boundaries 12 and beyond boundary 74. This stage, generally depicted at 80, is conventionally referred to as a "level translator and output stage."

In the earlier amplification stage 74, resistor $R_7$ on line 82 functions as a resistance to an amplification in stage 80. Inasmuch as the signal emanating from stage 74 is considered as coming from a voltage source, the amplification arrangement forms a translation of the level of this voltage by deriving a constant current flow through resistor $R_7$. The constant current is provided by a current generating network including resistor $R_9$, diode $D_3$ and a transistor $Q_{11}$. The latter network functions to adjust the biasing level of the amplification system while transmitting the amplified signal without modification. The signal from the level translating network is presented at line 84 to the base electrode of an input transistor $Q_{12}$ for ultimate presentation to transistors $Q_{13}$ and $Q_{14}$. The latter transistors operate to perform a push-pull amplification of the thusly treated signal. A resistor $R_8$ in line 78 forms a feedback resistance for this amplification arrangement. The output of the final amplification stage is presented along line 22 for insertion into the feedback path line 20 and the voltage sensitive trigger circuit 50.

Operational amplifiers typically require the presence of a small biasing current at their input terminals in order to provide a more accurate and effective operation. In the present amplification arrangement such a biasing current is purposely inserted into the input side of the amplifier through a voltage dividing network indicated generally at 90. Network 90 includes resistors $R_{10}$ and $R_{11}$ coupled between line 38 and input terminal 16. These resistors are joined along line 92 having a terminal 94 to which is coupled a feedline 96 including resistor $R_{12}$. Line 96 is, in turn, coupled with input terminal 14. The resistance values within network 90 are selected so as to insert a low, threshold level bias current into the amplifier 12. This insertion is effective to broaden the photosensitive characteristics of the exposure control system. Since the photovoltaic cell 10 may be called upon to detect very low light light levels, the biasing current inserted by network 90 will permit substantially all of the signal current generated by the photocell to be inserted into feedback line 18. Without the biasing current supplied by network 90, such very low level signals would be drawn to the amplifier rather than the feedback path.

As has been suggested earlier, the above described exposure control system retains a desirable flexibility such that it may be inserted within a number of exposure control programs. The use of a photovoltaic cell for sensing light level illumination provides not only a very desirable rapid response rate but also a highly desired linear output characteristic. The latter linear mode of operation is available with the cell by virtue of its combination with an amplifier 12 whose input circuit includes a feedback path incorporating a capacitor as at 24. With the feedback arrangement, the cell 10 is permitted to operate with a substantially zero load resistance. Consequently, the linear characteristic of its current mode of operation may be relied upon by the system. During a light sensing operation, the light sensing output of the cell is treated by the circuitry of the invention to evolve a linear output having a characteristic resembling the curves of FIG. 4 of the drawing. The slope of this characteristic may be varied to suit the particular exposure parameter which the sensing system seeks to control. By selection of appropriate voltage output levels, exposure values may be determined for regulating an exposure parameter. In the description to follow, exposure mechanisms are described which may be controlled by the above discussed system.

EXPOSURE INTERVAL CONTROL EMBODIMENT

In a shutter arrangement now discussed the exposure mechanism shown functionally at 46 in FIG. 1 serves to control an exposure parameter representing exposure time interval in response to the output of the sensing circuitry. A regulation of the exposure interval parameter permits full advantage to be taken of the rapid reaction of the system to transient scene lighting. For instance, the automatic shutter mechanism of the instant embodiment is sufficiently reactive to respond to scene lighting produced by flash illumination. The linear output of the photosensitive circuitry of the control system permits accurate photometric evaluations over a broad range of light levels.

Figure 5:
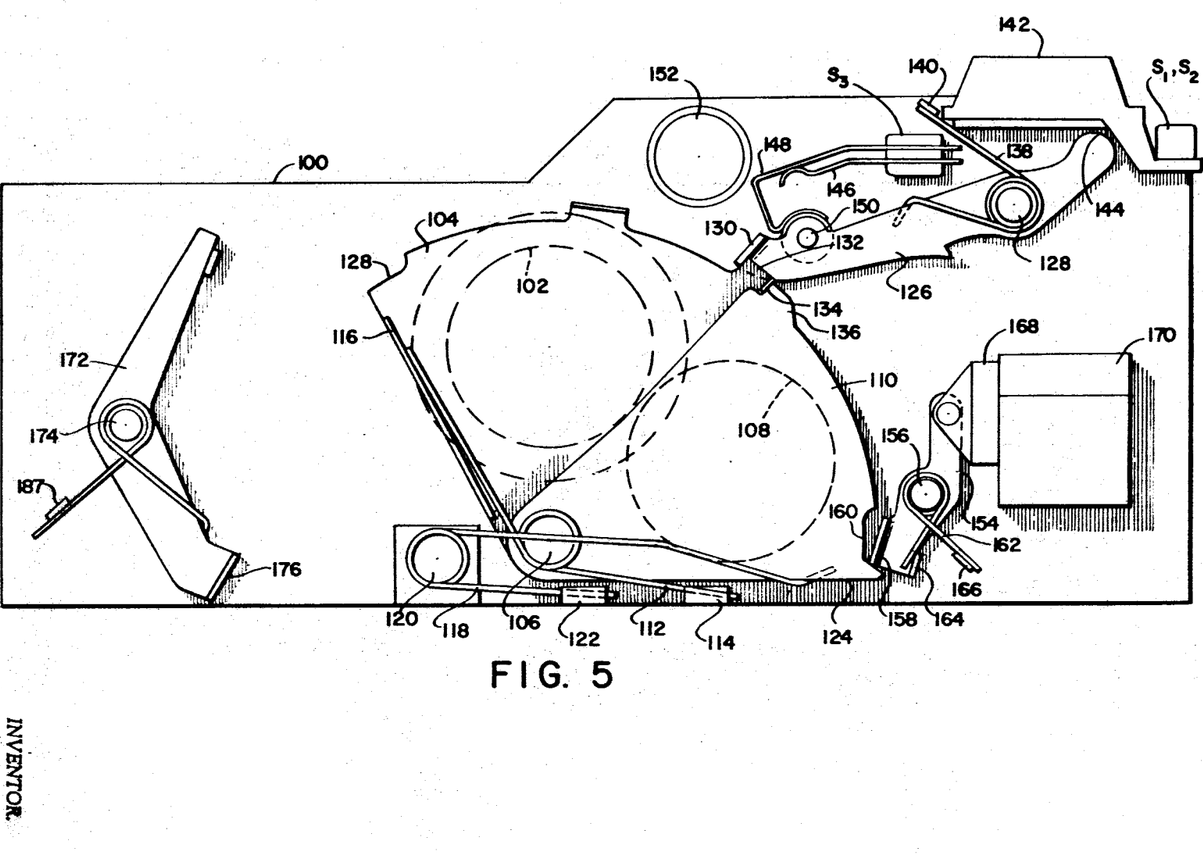
FIG. 5 is a diagrammatic, plan view of a photographic shutter assembly incorporating the control system of the present invention, the various elements of the shutter assembly being shown in an initial or cocked position.
Figure 6:
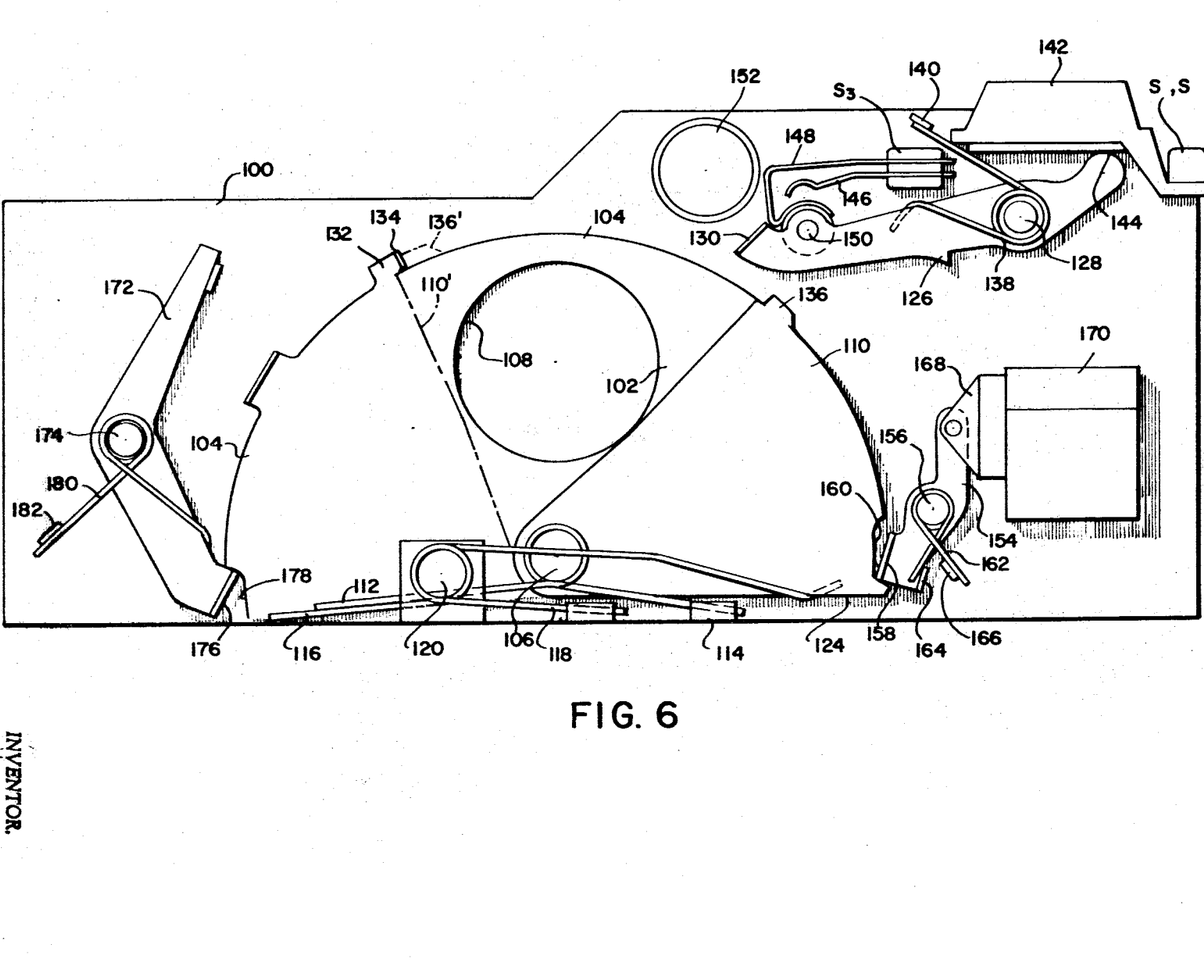
FIG. 6 is a plan view of the shutter assembly of FIG. 5 showing the positions of the various elements of the shutter during an exposure interval.

Referring to FIGS. 5 and 6, a shutter mechanism is portrayed which is of a variety utilizing a pair of opaque planar shutter blades. These blades are configured in an arrangement for sequentially covering and uncovering the optical path or exposure aperture of a camera. At the commencement of an exposure interval a first of these blades, termed the "opening blade," moves to a position causing the unblocking of the optical path of the camera. Following an appropriately timed interval of exposure, a second blade termed the "closing blade," is released for movement to a position causing a covering of the optical path. An exposure interval is derived as the time elapsed between the opening and closing of the shutter blades and is controlled by the timed release of the closing blade in correspondence with the intensity of scene light.

In FIG. 5, the shutter arrangement is illustrated in an orientation wherein the shutter blades are cocked in readiness for an exposure. The shutter mechanism includes a base plate 100 upon which the regulatory elements of the device are mounted. Base plate 100 is formed having a circular opening 102 coaxially aligned with the optical axis of the photographic apparatus or camera within which the shutter mechanism is used. Opening 102 is typically dimensioned having a diameter coextensive with the maximum aperture adjustment of the optical system. Since the FIG. 5 portrayal of the hutter mechanis illustrates a cocked or loaded status for the shutter mechanism, opening 102 is covered by the planar opaque portion of an opening blade 104. Blade 104 is rotatably mounted upon the base plate 100 at a pivotal connection indicated at 106. The planar face of opening blade 104 also is formed having an annular opening 108 having the same diameter as optical path opening 102. Openings 102 and 108 are displaced from the axis of pivot 106 by equal radial distances. Positioned over and mounted coaxially with the opening blade 104 is a planar opaque closing blade 110. Blades 104 and 110 are configured and mounted upon the base 100 so as to selectively occlude light passing through opening 102 as they are rotated about their mutual pivot 106. To provide for the mechanical translation of the opening and closing blades during an exposure, each of the blades is biased for counterclockwise rotation by a wire spring. For instance, opening blade 104 is biased for counterclockwise rotation by a wire spring 112 centrally wound about an extension of pivot member 106. The spring 112 has a stationary side of the tip of which is fixed to a bracket 114 mounted on base 100. Extending oppositely from the pivot extension at 106 a transitional tip of spring 112 provides counterclockwise oriented biasing force to opening blade 104 through pressure exerted against a radial flange 116 formed integrally with the blade. Closing blade 110 is biased for counterclockwise rotation about pivot 106 by a wire spring 118. Spring 118 is slidably wound about a capstan member 120 fixed to the base 100. Similar to the spring 112, spring 118 has a stationary side which is attached to a bracket 122 fixed to the base plate 100. The opposite arm of spring 118 bears against radial edge 124 of closing blade 110 as by an overlapping connection or the like and functions to bias the blade for counterclockwise rotation.

Opening and closing blades 104 and 110 are retained in a pre-exposure cocked position by virtue of their latching engagement with a shutter release arm 126. Arm 126 is rotatably mounted at a pivot 128 attached, in turn, to the base plate 100. A latching portion of the arm extends towards the shutter blades from the pivot 128 to terminate in an L shaped flange 130. In cocked position, flange tip 130 abuts against the forward edge of a tab 132 protruding outwardly from the curved upper edge of opening blade 104. Tab 132 is configured having an outwardly bent flange portion 134 which is dimensioned so as to abut against the radial edge of a tab 136 extending outwardly from the curved perimeter of closing blade 110. To maintain a sufficient holding force against the radial edge of tab 132, release arm 126 is biased in a counterclockwise direction by a wire spring 138. The central structure of spring 138 is slidably mounted over an extension of pivot 128. A stationary arm of spring 138 is positioned against a stud 140 protruding from the base member 100, while the transitional side of the spring is hooked over the upward edge of arm 126.

Shutter release arm 126 is caused to unlatch and release opening blade 104 upon being rotated in a clockwise direction. Such movement is imparted to the release arm by a downward movement of a shutter release button 142 which cams against the upward curved surface 144 of arm 128. It will be apparent that the manual depression of shutter release button 142 initiates an exposure. Such movement of the release button also causes the closing of simultaneously actuated switches $S_1$ and $S_2$ depicted in functional form on the drawing. A resultant rotation of arm 126 also causes the actuation of a switch $S_3$ which is mounted above the arm and upon base plate 100. Switch $S_3$ is of a normally closed variety and is formed having stationary and movable contact arms shown respectively at 146 and 148. Normally closed contact members 146 and 148 are opened as a cylindrical bearing member 150 fixed to arm 126 rotates upwardly with the release arm to contact the spring biased member 148, thereby moving it away from member 146. Within base plate 100 and near switch $S_3$ there is positioned a mounting aperture 152 for retaining at least one photovoltaic cell in orientation somewhat coincident with the taking axis of the optics of the camera. FIG. 5 portrays the orientation of the opening and closing blades in their terminal position for a cocked status of the shutter. Their functioning during an exposure interval is more clearly portrayed in FIG. 6. Referring to that figure, it will be seen that upon the unlatching of release arm 126 from tab 132, the opening blade 104 has rotated in a counterclockwise direction about pivot 106 to its second terminal or open position. In this position, the opening 108 in the opening blade has rotated with the blade to a position where its periphery is aligned in registry with the optical path opening 102 in base 100. Blade 104 has rotated under the bias of wire spring 112. Note also that contacts 146 and 148 of switch $S_3$ have been opened by the rotation of shutter release arm 126. As a result of the mechanical inertia present in the arm and shutter release button mechanism, these contacts will remain open throughout a conventional photographic exposure interval. As opening blade 104 rotates to an open terminal position, the closing blade 110 will be held in position until the termination of an exposure interval. The mechanism providing for this timed delay is provided by a latching arm 154 which is rotatably mounted upon a pivot 156 extending from the base 100. The latching arm is formed having an outwardly extending tab 158, which during an exposure interval, releasably engages blade 110 by abutting against the bottom surface of an indentation 160 formed within the blade. Arm 154 is biased in a counterclockwise direction by a wire spring 162 slidably mounted over an extension of pivot 156. The transitional side of spring 162 abuts against a flange 164 formed in arm 154 while the stationary side of the spring nests against a bracket 166 mounted upon base plate 100. Hinged to the opposite side of arm 154 is a magnetizable keeper 168. The keeper is configured to mounted upon base plate 100. When energized, the electromagnet 170 supplies sufficient attractive force to the keeper 168 for overcoming the rotational bias imparted to arm 154 by the wire spring 162. When the electromagnet 170 is de-energized, the spring 162 will cause latching arm 154 to rotate in a manner disengaging tab 158 from the bottom surface of indentation 160 of closing blade 110. Such activity will cause the closing blade 110 to rotate under the bias of spring 118 to a position shown in phantom style by dotted line 110' wherein scene light is occluded from passage through the aperture or optical path opening 102. Note that in this closed terminal position, the edge of tab 136 limits the counterclockwise travel of the closing blade by resuming an abutting position against tab 134 as indicated at 136'.

The shutter mechanism is recocked by manual rotation of a recocking lever 172 which is rotatably mounted upon base 100 at a pivot member depicted at 174. Lever 172 is formed having an outwardly extending tab 176 at its lower tip. Tab 176 is configured and arranged to cooperate with a notch 178 formed within the periphery of opening blade 104. It will be apparent that as the lever 172 is rotated about its pivot 174 the flange 176 will abut against the upward edge of notch 178 to urge the opening blade into its cocked or terminal position. As this rotational movement of the opening blade takes place, the flange portion of tab 134 on the opening blade will abut against the radial edge of closing blade tab 136 so as to cause a mutual movement of the opening and closing blades to their cocked status. In order to manipulate the tabs 136 and 132 behind the flange 130 of shutter release arm 126, the leading edge of tab 136 is curved to provide a camming action as it passes beneath tab 130. Recocking lever 172 is returned to the position shown following a cocking maneuver by virtue of the bias imposed by a spring 180 slidably mounted over an extension of pivot 174. The spring 180 is configured having a transitional side hooked over the bottom leg of cocking lever 172 and a stationary side abutting a bracket 182 mounted within base 100.

OPERATION

The exposure mechanism described in connection with FIGS. 5 and 6 operates in conjunction with the exposure control system illustrated and described in conjunction with FIGS. 1 through 4. An exposure sequence is initiated as a camera apparatus is oriented towards a scene and the shutter release button 142 is depressed. As button 142 moves downward, power switches $S_1$ and $S_2$ are simultaneously closed to energize the circuitry of the system. At the same time, shutter release arm 126 is caused to rotate in a clockwise direction thereby releasing the opening blade 104 and opening the normally closed switch $S_3$. This activity initiates exposure by bringing the opening 108 in the opening blade into registry with the optical path of a camera. The actuation of switches $S_1$ to $S_3$ permits the energization of coil 44 and the opening of the shunt path 26 across capacitor 24. Coil 44 may be assumed to be the operative component of electromagnet 170. Its energization through the normally conducting stage of trigger circuit 50 is effected at the closure of switch $S_1$. As a result of this energization, the keeper 168 is held against magnet 170 and the tab 158 of latching arm 154 functions to hold the closing blade 110 in an open aperture position until coil 144 is de-energized.

The photovoltaic cell 10, which is the instant embodiment may be positioned within mounting 152, functions to generate a linear current mode signal upon the opening of normally closed switch $S_3$. Using the output of photovoltaic cell 10, the circuitry then functions to monitor the light levels of a scene being photographed to provide an output at line 22 of the circuit. By virtue of the above described unique circuit characteristics of the system, this output will be a linear voltage buildup for any given amount of light passing through the optical system of the camera. As the voltage output signal reaches a predetermined level, termed the triggering level, transistor $Q_1$ of the voltage sensing triggering circuit 50 will be forward biased into conduction. The conduction of transistor $Q_1$ will function to remove the bias from normally conducting transistor $Q_2$, thereby de-energizing coil 44 of electromagnet 170. The de-energization of electromagnet 170 will remove its attractive force with keeper 168 permitting latching arm 154 to rotate counterclockwise under the bias of spring 166. This rotation will unlatch the closing blade 110 permitting it to rotate under the force of spring 118 to a closing terminal position indicated at 110'. The exposure interval is thereby terminated and the shutter mechanism may be recocked by rotating recocking lever 172 in a counterclockwise direction. The camera system may be calibrated to function with films of varying speeds of sensitometric properties by adjustment of wiper arm 28 of potentiometer 26. Because of the very rapid response of the photovoltaic cell 10 to transient lighting conditions, the system is capable of following the rapid rise times encountered in flash photography. This rapid reaction is very valuable where flash illumination is to be used within a variety of reflective environments.

APERTURE CONTROL EMBODIMENT

In the photographic mechanism now discussed, the exposure mechanism shown functionally at 46 in FIG. 1 is called upon to control the exposure parameter representing aperture size in response to the output of the sensing circuitry. The rapid response of the sensing system is particularly advantageous for the present embodiment inasmuch as the arrangement must accommodate for aperture blade dynamics. For instance, the mechanism functions to "scan" or alter the amount of scene light reaching the photovoltaic cell in synchronism and corresponding variation with a rapid and continual adjustment of aperture size. The linear output of the photosensitive circuitry of the control system permits high accuracy in the ultimate regulation of aperture dimension.

Figure 7:
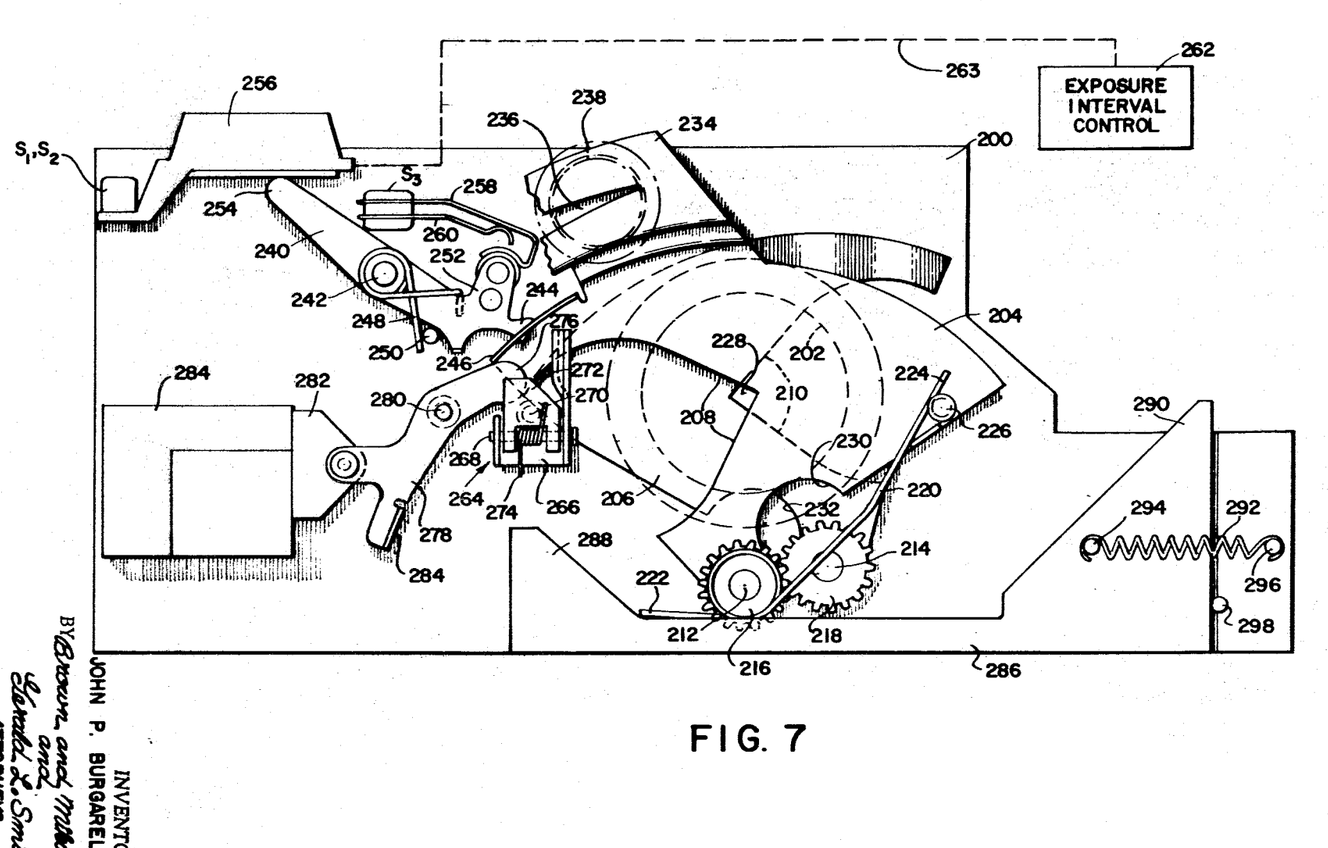
FIG. 7 is a diagrammatic, plan view of a photographic aperture control assembly incorporating the control system of the present invention, the various elements of the aperture regulating arrangement being shown in an initial or a cocked position.
Figure 8:
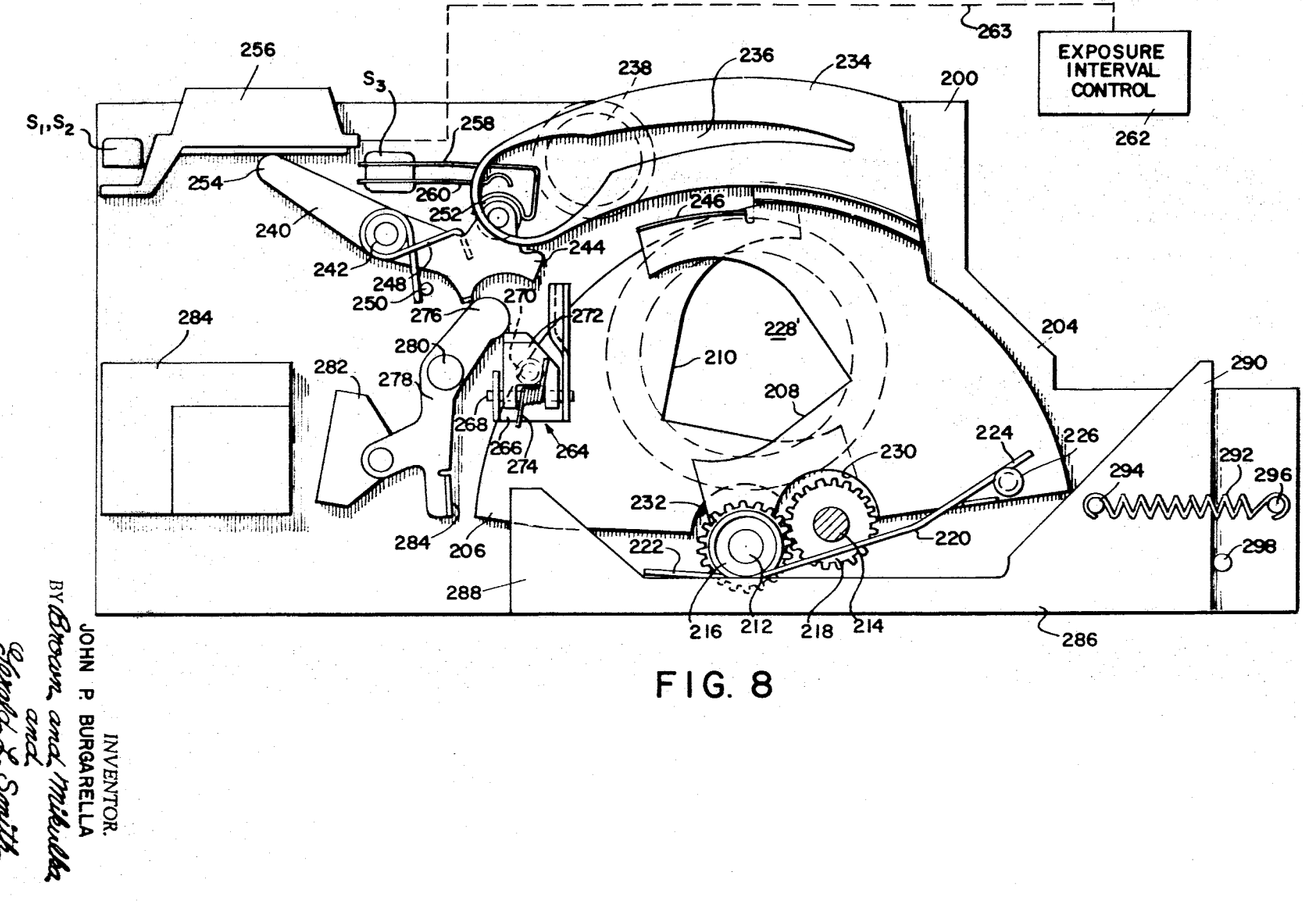
FIG. 8 is a plan view of the aperture control assembly of FIG. 7 showing the positions of the various elements of the assembly during an exposure sequence.

Referring to FIGS. 7 and 8, an aperture control mechanism is portrayed which is of a variety utilizing a pair of opaque planar aperture defining blades. These blades are configured and arranged to mutually and synchronously coact and progressively enlarge the aperture over an optical system until a proper aperture opening is defined by the blades. At the commencement of an exposure sequence, the blades are at a terminal position defining a minimum aperture. Upon actuation of the exposure control system, the blades are caused to open as the photovoltaic cell of the system is scanned. The blades are clamped in position as the voltage buildup of the light level detection circuitry reaches a predetermined threshold or triggering value, at which time aperture blade movement is arrested and the exposure sequence continues to a conclusion. For instance, the system may be used with a fixed exposure interval time mechanism or with an automatic exposure interval control system.

In FIG. 7, the aperture control arrangement is illustrated in orientation wherein the aperture blades are cocked in readiness for an exposure. The regulating mechanism includes a base plate 200 upon which the regulatory elements of the device are mounted. Base plate 200 is formed having a circular opening 202 coaxially aligned with the optical axis of the photographic apparatus or camera within which the aperture regulating mechanism is used. Opening 202 is typically dimensioned having a diameter coextensive with the maximum aperture adjustment of the optical system. Aperture adjustment over opening 202 is provided by two aperture defining blades 204 and 206. Each of the planar opaque blades 204 and 206 are configured having notches the contoured edges of which are shown respectively at 208 and 210. The notches within each blade are shaped and arranged to cooperate in defining an aperture opening about the optical axis of the photographic apparatus. Blades 204 and 206 are rotatably mounted upon base plate 200 using pivotal shafts shown respectively at 212 and 214 which are journaled for rotation within base plate 200. To provide a reciprocal coaction between each of the aperture blades, externally meshing spur gears 216 and 218 are mounted respectively over and fixed to shafts 212 and 214. It will be apparent that the spur gears 216 and 218 permit a uniform synchronous and relative coaction between the aperture forming blades 204 and 206. Inasmuch as the aperture blades are linked for mutually opposed rotation through gears 216 and 218, only one of the blades need be driven to impart rotation to both. Accordingly, a singular wire spring 220 is arranged within the assembly having a stationary end 222 fixed to the base 200 and a flexed transitional end 224 positioned in biasing relationship against a pin 226 fixed to blade 204. The clockwise rotational force exerted by the spring 220 upon blade 204 serves to impose a counterclockwise rotational force upon blade 206 through the geared mechanical linkage between the blades. In the pre-exposure terminal or cocked position of the blades as shown, the minimum aperture which the blades are called upon to define is present as illustrated at 228. To provide for adequate transitional rotation of the aperture blades while maintaining structural compactness, semicircular indentations are formed within blades 204 and 206 respectively at 230 and 232.

A further examination of the shape of aperture blade 204 reveals an upwardly extending portion 234 within which is formed an elongate opening 236. Behind the extension 234 there is positioned an annular mounting 238 adapted to retain the photovoltaic cell means of the system in properly oriented position for witnessing scene illumination. This photovoltaic cell arrangement is mounted with respect to the extension 234 such that the amount of photic stimulation which it receives is regulated by the area of the elongate opening 236 presented before it at any given time during an exposure sequence.

The coacting aperture blades are held in the cocked or terminal position indicated in FIG. 7 by an aperture blade release arm 240. Arm 240 is mounted for rotation about a pivotal shaft 242 fixed to the base plate 200. The arm 240 is configured having a latching tip 244 which releasably engages blade 204 by virtue of its insertion within a slot within an outwardly bent flange 246 formed upon the upward edge of blade 204. Arm 240 is biased for rotation in a clockwise direction by a wire spring 248. Spring 248 is configured having a stationary side abutting against an upstanding pin 250 and a transitional side arranged to hook over the upward edge of arm 240. Note that the pin 250 functions to limit the clockwise rotational travel of arm 240.

The upward edge of arm 240 is additionally configured to include a cylindrical contact member 252 at one end and a circular cam surface 254 at the opposite end. Cam tip 254 is arranged to make slidable contact with the underside of a release button 256. Downward movement of release button 256 will impose a counterclockwise rotation upon arm 240 so as to release its engagement with aperture blade 204 and to cause bearing surface 252 to rotate upwardly against a movable contact arm 258 of a switch $S_3$. Mounted upon the base plate 200, switch $S_3$ is of a normally closed variety having a stationary contact arm 260 in addition to that at 258. The downward movement of release button 256 will also cause the simultaneous actuation of switches $S_1$ and $S_2$ shown on the drawings in generalized fashion. Release button 256 may also be used to actuate a mechanical or electrical exposure interval control function depicted in generalized block fashion at 262. A dotted line linkage between button 256 and functional block 262 is shown at 263.

From the foregoing description of the dynamics of the mutually rotative aperture blades 204 and 206, it may be seen that the aperture size is varied with a continuous rather than incremental or stepped motion. To arrest the motion of the blades at an appropriate aperture size, a mechanical braking arrangement shown generally at 264 is mounted upon base plate 200. The braking system is fully described and illustrated in a copending application for patent by Lawrence M. Douglas, Ser. No. 784,064, filed Dec. 15, 1968—in lieu thereof entitled: "Aperture Defining Exposure Control System," assigned to the common assignee and filed of even date herewith. It is not to be considered as part of the present invention. Brake structure 264 comprises a mounting structure 266 supporting an axle 268 in a plane parallel to the surface of aperture blade 206 and spaced therefrom a select distance. Axle 268 pivotally supports a braking member comprising a dog or brake shoe portion 270 which is canted toward aperture blade 206 and formed integrally with an outwardly protruding lever section 272. The braking member is biased for clockwise or inward rotation about the axle 268 by virtue of a wire spring 274 slidably wound about axle 268, one end of which abuts the lever section 272. The brake shoe portion 270 is held away from the surface of aperture blade 206 as a result of a downward pressure exerted by the tip 276 of a brake release arm 278. Arm 278 is rotatably attached to the base plate 200 at a pivot member 280. The opposite side of the release arm includes an extension to which is pivotally attached a magnetizable keeper 282 and an outwardly bent flange 284. In the orientation shown in FIG. 7, the brake shoe portion 270 is drawn away from the surface of blade 206 as a result of the orientation of arm 278 and the lowered position of its tip 276. This arm orientation is effected by virtue of the magnetic attraction between keeper member 282 and an energized electromagnet 284. Such orientation permits the free pivotal movement of aperture blades 204 and 206.

The relative orientation of the components of the aperture defining mechanism during an exposure is portrayed in FIG. 8. Referring to that figure, it will be see that upon the downward movement of release button 256 the release arm 240 has rotated in a counterclockwise direction to unlatch the aperture blades. Simultaneously, the contact arms 258 and 260 of switch $S_3$ have been caused to separate. The aperture blades 204 and 206 have pivoted at the same speed and in opposite directions to a position defining an aperture opening indicated at 228'. At the same time, the opening 236 within the extension 234 of blade 204 has passed across the face of a photovoltaic cell mounted at 238 presenting a progressively larger opening to the photosensitive face of the cell. At a position where the aperture blades define a proper aperture size, the force of attraction between electromagnet 284 and keeper 282 was removed permitting the brake release arm 278 to be rotated in a counterclockwise direction under the impetus of the spring bias supplied to the lever portion 272 of the braking assembly 264. The resultant pivotal movement of the braking lever section 272 permits the brake shoe to swing against the opening aperture blade 206, thereby arresting its pivotal motion. Because of the geared connection between the aperture blades, a halting of one blade also halts the other.

A recocking mechanism is included with the aperture control mechanism illustrated. The mechanism includes a recocking arm 286 mounted upon base plate 200 and slidable thereacross. Arm 286 is formed having an upstanding tip 288 which is of dimension appropriate for making abutting contact with the flange 284 of brake release arm 278 as the recocking arm is moved from right to left. Such movement of arm 286 will rotate arm 278 in a clockwise direction thereby permitting the union of keeper 282 with electromagnet 284 and the release of brake shoe 270 from aperture blade 206. The latter releasing activity is provided by the downward movement of arm tip 276 against the lever portion 272 of the braking assembly. Recocking arm 286 also incorporates an oppositely disposed upstanding tip 290 having a canted surface adapted to cam against pin 226 of aperture blade 204, thereby causing its counterclockwise rotation to a position permitting the relatching of latching arm tip 244 with the slot in aperture blade flange 246. Inasmuch as the aperture blades 204 and 206 are linked for mutual rotation, the recocking maneuver imposed upon blade 204 will also cause a corresponding repositioning of blade 206. Recocking lever 286 is returned to standby position by virtue of a coil spring 292 tensioned between a pin 294 fixed to arm tip 290 and a pin 296 fixed to base plate 200. A pin 298 is fixed to base 200 for purposes of limiting the return motion of the arm 286.

OPERATION

The aperture adjustment mechanism described in connection with FIGS. 7 and 8 operates in conjunction with the exposure control system illustrated and described in connection with FIGS. 1 through 4. When incorporated within a photographic camera, the camera is appropriately oriented towards the scene to be photographed and an exposure sequence is commenced with the depression of the release button 256. As button 256 moves downward, power switches $S_1$ and $S_2$ are simultaneously closed to energize the circuitry of the system. At the same time, aperture blade release arm 240 is caused to rotate in a counterclockwise direction thereby unlatching aperture blade 204 and opening the normally closed switch $S_3$. Switch $S_3$ is held open throughout the aperture regulation sequence by the mechanical inertia imposed upon the return movement of button 256. The actuation of switches $S_1$, $S_2$ and $S_3$ permits a corresponding energization of coil 44 and the opening of the shunt path 26 across capacitor 24. Coil 44 may be assumed to be the operative component of electromagnet 284 and its energization through the normally conducting stage of trigger circuit 50 is effected at the closure of switch $S_1$. As a result of this energization, the keeper 282 is held against electromagnet 284 and the brake release arm tip 276 functions to hold lever portion 270 of the braking assembly 264 in a downward position. This orientation of the braking arrangement holds the brake shoe portion 276 of the braking assembly away from contact with aperture blade 206.

With the unlatching of aperture blade 204, the mechanically linked blades 204 and 206 pivot under the bias of spring 224 in opposite directions toward a fully open position. This opening movement is of a continuous nature and as it occurs the contours of notches 208 and 210 define a progressively enlarging aperture opening over the camera optical path.

Simultaneously and in synchronism with the opening of the aperture before the optical path, slot 236 of upwardly extending blade portion 234 is moved across the face of a photovoltaic cell at 238. The amount of light permitted to impinge upon the photocell at 238 varies in coordinated fashion with the amount of light permitted to enter the optical path by coacting aperture notches 208 and 210. Note in this regard that at the initiation of the pivotal movement of the aperture blades, slot 236 presents only a minimal light transmittal area before the face of the photovoltaic cell at 238. As the pivotal movement of the aperture blades progresses, however, the amount of light permitted to reach the photovoltaic cell is increased to a maximum representing the largest aperture dimension available in the system. With such a synchronous relationship between the light permitted to pass through the optical path as a result of aperture size and of the amount of photic stimulation permitted at a photovoltaic cell, the output signal of the cell at 238 is controlled to represent a function of aperture size.

Returning to the circuitry of the aperture adjusting system, the photovoltaic cell 10, which in the instant embodiment may be positioned within mounting 238, functions to generate a linear, current mode signal upon the opening of normally closed switch $S_3$ at the beginning of blade movement. Using the output of photovoltaic cell 10, the circuitry then functions to monitor the light levels of the scene which it witnesses so as to provide an output at line 22. As a result of the coordinated variation of optical path aperture size and slot dimension 236, this output represents an exposure value for any given aperture opening. As the aperture blades continue to open, the output of the system progressively increases in value in representation of the amount of light passing through the optical system of the camera. When the voltage output signal reaches a predetermined level, termed "a triggering level," transistor $Q_1$ of the voltage sensing triggering circuit 50 will be forward biased into conduction. The conduction of transistor $Q_1$ will function to reverse bias normally conducting transistor $Q_2$, thereby de-energizing coil 44 of electromagnet 284. The de-energization of electromagnet 284 will remove the attractive force imposed upon keeper 282 thereby permitting brake release arm 278 to rotate in a counterclockwise direction under a force derived from spring 274. This rotation will cause the brake shoe portion of the braking arrangement to move into and abruptly stop the movement of aperture blade 206. Inasmuch as blade 206 is mechanically linked with blade 204, blade 204 will stop simultaneously. Following an appropriate exposure interval as determined at block function 262, the exposure sequence will be terminated. The aperture control system may be calibrated for functioning with films of varying speeds or sensitometric properties by adjustment of wiper arm 28 of potentiometer 26. This adjustment is both simple and highly accurate inasmuch as it need only provide gain control for the amplification output. The system is capable of accommodating the dynamics encountered with such a continuous aperture blade adjustment as a result of the high response rates of photovoltaic cell 10.

Recocking of the aperture control mechanism is provided by moving arm 286 to the left such that the edge of its upstanding tip 290 forces the aperture blades to a latched minimum aperture position and upstanding tip 288 returns keeper 282 into contact with electromagnet 284.

Since certain changes may be made in the above exposure control systems without departing from the scope of the invention herein involved, it is intended that all matter contained in the above description or shown in the accompanying drawings shall be interpreted as illustrative and not in a limiting sense.

What is claimed is:

1. An automatic exposure control apparatus for a photographic camera comprising in combination:

aperture defining means having at least one element movable between terminal positions defining minimum and maximum exposure apertures over the optical path of said camera;

spring means for urging said element from one terminal position toward the other terminal position;

brake means for selectively halting the movement of said element induced by said spring means;

photovoltaic cell means oriented with respect to a scene being photographed for generating a sensing output current representative of the light levels thereof;

direct current operational amplifier means having a differential input circuit connected to said photovoltaic cell means and including a feedback path incorporating impedance means for deriving an input impedance of substantially zero such that the current generated by said photovoltaic cell means is limited primarily by the internal impedance of said photovoltaic cell means, said direct current operational amplifier means being operative to produce a control signal in response to said photovoltaic cell means current; and circuit means responsive to predetermined levels of said direct current amplifier means control signal for selectively actuating said brake means so as to halt the movement of said aperture element at a position defining an exposure aperture regulating the passage of light through said optical path in accordance with selected photometric criteria.

2. The automatic exposure control apparatus of claim 1 wherein said aperture defining means comprises a pair of opaque blades configured and arranged to mutually and synchronously coact to define continuously variable apertures when moved between said terminal positions.

3. The automatic control apparatus of claim 2 wherein one said movable blade is configured and arranged with respect to said photovoltaic cell means for attenuating scene light incident upon said cell means in correspondence with the said aperture defined by said blades.

4. An exposure control system for use with photographic apparatus comprising:

photoresponsive signal generating means oriented with respect to a scene to be photographed for generating a sensing output current representative of the light incident thereon from the scene;

differential input circuit connected to said signal generating means and including a feedback path incorporating impedance means for deriving an input impedance of substantially zero such that said current generated by said photoresponsive generating means is limited substantially only by the internal impedance thereof, said operational amplifier means being operative to produce a control signal in response to said photoresponsive signal generating means output current;

an exposure mechanism having at least one element movable to define progressively varying exposure apertures over the optical path of said apparatus;

means for attenuating scene light incident upon said photoresponsive signal generating means synchronously and in correspondence with the instantaneous values of said exposure apertures defined by said exposure mechanism;

electromagnetic means selectively energizable for controlling said exposure mechanism; and threshold level detecting means responsive to the said control signal of said direct current operational amplifier means and including a transistor stage coupled with said electromagnetic means for selectively energizing said electromagnetic means to control said exposure mechanism.

5. The exposure control system of claim 4 wherein said impedance means comprises at least one capacitor.

6. The exposure control system of claim 4 wherein said feedback path includes variable resistor means coupled between the output of said direct current operational amplifier means and said impedance means, for selectively controlling the response rate thereof.

7. The exposure control system of claim 4 in which said threshold level detecting means comprises a voltage sensitive trigger circuit operative to switch a current supply when said direct current operational amplifier means control signal reaches a predetermined level.

8. The exposure control system of claim 4 in which said threshold level detecting means includes trigger circuit means responsive to predetermined levels of said direct current operational amplifier means control signal for selectively energizing said electromagnetic means at the termination of an exposure interval; and said exposure mechanism includes shutter means for terminating said exposure interval in response to said electromagnetic means selective energization.

9. The exposure control system of claim 4 including means for inserting a threshold level bias current into the input of said direct current operational amplifier means so as to cause substantially all of said current generated by said photoresponsive signal generating means to be inserted into said feedback path.

10. An exposure control system for use with photographic apparatus comprising:

photovoltaic cell means oriented with respect to a scene to be photograph for generating a sensing output current representative of the light incident thereon from the scene;

direct current operational amplifier means having a differential input circuit connected to said photovoltaic cell means and including a feedback path incorporating impedance means for deriving an input impedance of substantially zero such that current generated by said photovoltaic cell means is limited substantially only by the internal impedance thereof, siad operational amplifier means being operative to produce a control signal in response to said photovoltaic cell means output;

means for inserting a threshold level bias current into the input of said direct current operational amplifier means so as to cause substantially all of the said current generated by said photovoltaic cell means to be inserted into said feedback path;

an exposure mechanism actuable to regulate the passage of light through a photographic lens system;

electromagnetic means selectively energizable for actuating said exposure mechanism; and threshold level detecting means responsive to the said control signal of said direct current operational amplifier means and including a transistor stage coupled with said electromagnetic means for selectively energizing said electromagnetic means to control said exposure mechanism in accordance with the light levels of said scene.

11. The exposure control system of claim 10 in which:

said exposure mechanism includes shutter means for initiating and terminating an interval of exposure; and said threshold level detecting means includes circuit means responsive to the magnitude of said direct current operational amplifier means control signal for determining said exposure time interval in accordance with the light levels of said scene.

12. The exposure control system of claim 10 in which said feedback path impedance means is present as a capacitor.

13. The exposure control system of claim 10 in which said exposure mechanism includes:

at least one element movable to define progressively varying apertures over the optical path of said apparatus; and means for attenuating scene light incident upon said photovoltaic cell means synchronously and in correspondence with the instantaneous values of said exposure apertures.

References Cited

UNITED STATES PATENTS

| | | | |
|---|---|---|---|
| 3,053,985 | 9/1962 | Grammer, Jr. et al. | 95—10 C X |
| 3,120,161 | 2/1964 | Dickens et al. | 95—64 |
| 3,205,795 | 9/1965 | Grey | 95—10 C |
| 3,292,515 | 12/1966 | Sato et al. | 95—10 C |
| 3,399,307 | 8/1968 | Levin | 95—10 C X |
| 3,426,662 | 2/1969 | Sevin | 95—10 C |
| 3,430,053 | 2/1969 | Westhauer | 250—214 |
| 3,476,028 | 11/1969 | Namba et al. | 95—42 |
| 3,482,497 | 12/1969 | Ernisse | 95—10 C |
| 3,504,601 | 4/1970 | Schubert | 95—10 C |
| 3,504,603 | 4/1970 | Brzonikala et al. | 95—10 C |

SAMUEL S. MATTHEWS, Primary Examiner

J. F. PETERS, Jr., Assistant Examiner

U.S. Cl. X.R.

95—53 E, 64 C; 250—214; 356—222